(12) United States Patent
Luo et al.

(10) Patent No.: US 11,817,696 B2
(45) Date of Patent: Nov. 14, 2023

(54) HIGH-RELIABILITY MULTIPHASE POWER SUPPLY SYSTEM AND METHOD

(71) Applicant: INSPUR SUZHOU INTELLIGENT TECHNOLOGY CO., LTD., Jiangsu (CN)

(72) Inventors: Siheng Luo, Jiangsu (CN); Hui Li, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/024,735

(22) PCT Filed: Jun. 30, 2021

(86) PCT No.: PCT/CN2021/103407
§ 371 (c)(1),
(2) Date: Mar. 3, 2023

(87) PCT Pub. No.: WO2022/048285
PCT Pub. Date: Mar. 10, 2022

(65) Prior Publication Data
US 2023/0246436 A1 Aug. 3, 2023

(30) Foreign Application Priority Data

Sep. 4, 2020 (CN) .......................... 202010925430.X

(51) Int. Cl.
*H02H 7/12* (2006.01)
*G06F 1/324* (2019.01)
*H02H 1/00* (2006.01)

(52) U.S. Cl.
CPC ........... *H02H 7/1203* (2013.01); *G06F 1/324* (2013.01); *H02H 1/0092* (2013.01)

(58) Field of Classification Search
CPC .. H02M 3/158; H02M 3/1582; H02M 3/1584; H02M 3/1586; G06F 1/324;
(Continued)

(56) References Cited

U.S. PATENT DOCUMENTS

| 2005/0010825 | A1* | 1/2005 | Pullen | H02M 3/1584 713/300 |
| 2006/0280715 | A1* | 12/2006 | Vishnupad | A61K 47/10 424/70.13 |
| 2020/0021189 | A1* | 1/2020 | Li | H02M 3/158 |

FOREIGN PATENT DOCUMENTS

| CN | 102780396 A | 11/2012 |
| CN | 102780397 A | 11/2012 |

(Continued)

OTHER PUBLICATIONS

PCT/CN2021/103407 international search report.

*Primary Examiner* — Nguyen Tran
(74) *Attorney, Agent, or Firm* — IPRO, PLLC

(57) ABSTRACT

A high-reliability multiphase power supply system and method. A second processing unit is configured with a first field-effect transistor, a drain electrode of the first field-effect transistor is connected to a power supply, a source electrode of the first field-effect transistor is connected to the drain electrode of a second field-effect transistor, the source electrode of the second field-effect transistor is connected to ground, and the gate electrodes of the first field-effect transistor and the second field-effect transistor are connected to a first processing unit; the second processing unit is configured with a first current detection module and a second current detection module, the first current detection module and the second current detection module are electrically connected to a bus unit, and the bus unit is electrically connected to a substrate management controller.

18 Claims, 3 Drawing Sheets

(58) Field of Classification Search
CPC ... G06F 1/3243; G06F 1/3246; H02H 1/0092; H02H 1/06; H02H 1/063
See application file for complete search history.

(56) References Cited

FOREIGN PATENT DOCUMENTS

| | | |
|---|---|---|
| CN | 205509475 U | 8/2016 |
| CN | 108183465 A | 6/2018 |
| CN | 110034543 A | 7/2019 |
| CN | 110829804 A | 2/2020 |
| CN | 110896223 A | 3/2020 |
| CN | 112054484 A | 12/2020 |
| JP | 09121553 A | 5/1997 |

\* cited by examiner

HIGH-RELIABILITY MULTIPHASE POWER SUPPLY SYSTEM AND METHOD

This application claims the priority of the Chinese Patent application filed on Friday, Sep. 4, 2020 before the CNIPA, China National Intellectual Property Administration with the application number of 202010925430.X, and the title of "HIGH-RELIABILITY MULTIPHASE POWER SUPPLY SYSTEM AND METHOD", which is incorporated herein in its entirety by reference.

FIELD

The present application relates to the technical field of multiphase power supplies and, more particularly, to a high-reliability multiphase power supply system and method.

BACKGROUND

With the continuous rise of cloud computing technology, internet business is continuously increasing. Server computing nodes are required to have stronger and stronger data processing capacity, higher and higher deployment density, and greater and greater workload. Especially for the CPU chip inside the server, the workload current is increasing, up to 100 to 200 A. Therefore, in order to meet the power supply requirements of such a large current, the power supply for CPU chip generally adopts multiphase power supply.

In the current multiphase power supply solution, the power supply is controlled by a controller by sending out a pulse width modulation (PWM) signal to a plurality of field-effect transistor switches, wherein the output of the field-effect transistor switches is connected in parallel to form a large current output, and when the current flowing through the field-effect transistor is excessive, under a high load operating condition for in a long time, a field-effect transistor breakdown failure is easy to occur, resulting in the risk of short-circuiting to ground or burning a board. It affects the normal operation of customer service, and also brings hidden dangers to the fire safety of the data center room due to the burnt board. Meanwhile, once the problem of burning the board occurs, research and development engineers often invest resource electrodes to perform location analysis on the problem on site, the problem is difficult to reproduce on site due to the fact that the board is burnt, and it is difficult to find the primary cause for burning the board.

SUMMARY

The present application provides a high-reliability multiphase power supply system, aiming to solve the problem that when a field-effect transistor that controls the supply of current within the phase power supply fails, the failed field-effect transistor may not be quickly located.

In order to achieve the above object, the present application provides a high-reliability multiphase power supply system including a second processing unit and a substrate management controller, wherein the second processing unit is configured with a first field-effect transistor, a drain electrode of the first field-effect transistor is connected to a power supply, a source electrode of the first field-effect transistor is connected to the drain electrode of a second field-effect transistor, the source electrode of the second field-effect transistor is connected to ground, and the gate electrodes of the first field-effect transistor and the second field-effect transistor are connected to a first processing unit; the second processing unit is configured with a first current detection module, and the first current detection module detects a source-electrode output current of the first field-effect transistor; the second processing unit is configured with a second current detection module, and the second current detection module detects a source electrode current of the second field-effect transistor; the first current detection module and the second current detection module are electrically connected to a bus unit, and the bus unit is electrically connected to the substrate management controller; and the substrate management controller is electrically connected to a storage unit, and the substrate management controller is electrically connected to the first processing unit.

According to an embodiment of the present application, the second processing unit is configured with a first voltage detection module, the first voltage detection module detects a voltage of the power supply, and the first voltage detection module is electrically connected to the bus unit.

According to an embodiment of the present application, the bus unit is connected to the substrate management controller via a bus, and transmits measurement data of the first current detection module, the second current detection module and the first voltage detection module to the substrate management controller; the second current detection module is electrically connected to the first processing unit, and transmits measurement data to the first processing unit.

According to an embodiment of the present application, the first processing unit is configured with at least two PWM generation modules, any one of the PWM generation modules is electrically connected to a gate electrode of a first field-effect transistor in the second processing unit, and the PWM generation module is electrically connected to the gate electrode of a second field-effect transistor in the second processing unit via an inverter.

According to an embodiment of the present application, the source electrode of any one of the first field-effect transistors is connected to one end of a filter inductor, the other ends of all of the filter inductors are electrically connected to a grounded filter capacitor in common, and the other ends of all of the filter inductors are connected to a CPU load in common.

According to an embodiment of the present application, a second voltage detection module is configured at the CPU, the second voltage detection module detects the voltage division of the CPU driven by the current provided by the high-reliability multiphase power supply system, and the second voltage detection module is electrically connected to the first processing unit.

The present application further provides a method for fault detecting, locating and processing of the multiphase power supply system, applied to the high-reliability multiphase power supply system, which includes:
  configuring an identifier of the second processing unit, and establishing a mapping relationship between a location of the second processing unit and the identifier;
  acquiring the identifier, first current data and second current data from the second processing unit, and determining whether the second processing unit is abnormal and an abnormal type according to the first current data and the second current data;

acquiring the location of the second processing unit according to the identifier of the second processing unit when the second processing unit is abnormal; and performing a protection action when the second processing unit is abnormal.

Further, the first current detection module of the second processing unit measures and acquires the first current data, the second current detection module measures and acquires the second current data, and the substrate management controller acquires the first current data and the second current data via the bus unit;

a first threshold value that measures the first current data and a second threshold value that measures the second current data are set in the substrate management controller;

the substrate management controller compares the first current data with the first threshold value, compares the second current data with the second threshold value, and the second processing unit is abnormal when the first current data is greater than the first threshold value or the second current data is greater than the second threshold value.

Further, the mapping relationship is stored in the storage unit, the substrate management controller acquires the identifier of the abnormal second processing unit and the mapping relationship, and the substrate management controller determines the location of the abnormal second processing unit according to the identifier and the mapping relationship.

Further, the protection action includes:

a power supply input of an abnormal second processing unit is turned off when the first current data is greater than the first threshold; when the second current data is greater than the second threshold value, the signal output of the PWM generation module connected to the abnormal second processing unit is turned off, and reducing a frequency of the CPU to reduce a current demand; and abnormality information is recorded.

The high-reliability multiphase power supply system and method provided by the present application have the following beneficial effects:

when the substrate management controller acquires the occurrence of over-current information about the first field-effect transistor on the second processing unit from the bus unit, the substrate management controller is triggered to send a first signal to the power supply to turn off the output voltage of the power supply to avoid burning the CPU; when the substrate management controller acquires the occurrence of over-current information about the second field-effect transistor on the second processing unit from the bus unit, the substrate management controller is triggered to send a second signal to the first processing unit to turn off the corresponding PWM generation module in the first processing unit, and at the same time, the substrate management controller is triggered to send a third signal to the CPU to control the CPU to work at a reduced frequency, thereby ensuring that the CPU may work normally when the abnormal second processing unit does not supply power.

BRIEF DESCRIPTION OF THE DRAWINGS

In order to explain the embodiments of the present application or the technical solutions in the prior art more clearly, a brief description will be given below with reference to the accompanying drawings which are used in the description of the embodiments or the prior art, and it is obvious that the drawings in the description below are merely some embodiments of the present application, and it would have been obvious for a person skilled in the art to obtain other drawings according to the structures illustrated by these drawings without involving any inventive effort.

The numbers and meanings in the figures are as follows:
100, first processing unit, 101, PWM generation modules,
200, second processing unit, 201, first field-effect transistor, 202, second field-effect transistor, 203, first current detection module, 204, second current detection module, 205, bus unit, 206, first voltage detection module,
300, substrate management controller,
400, storage unit,
500, filter inductor,
600, filter capacitor,
700, second voltage detection module,
800, power supply.

The objects, features and advantages of the present application will be further described with reference to the accompanying drawings in conjunction with the embodiments.

DETAILED DESCRIPTION

It should be understood that the particular embodiments described herein are illustrative only and are not limiting.

Figure 1:
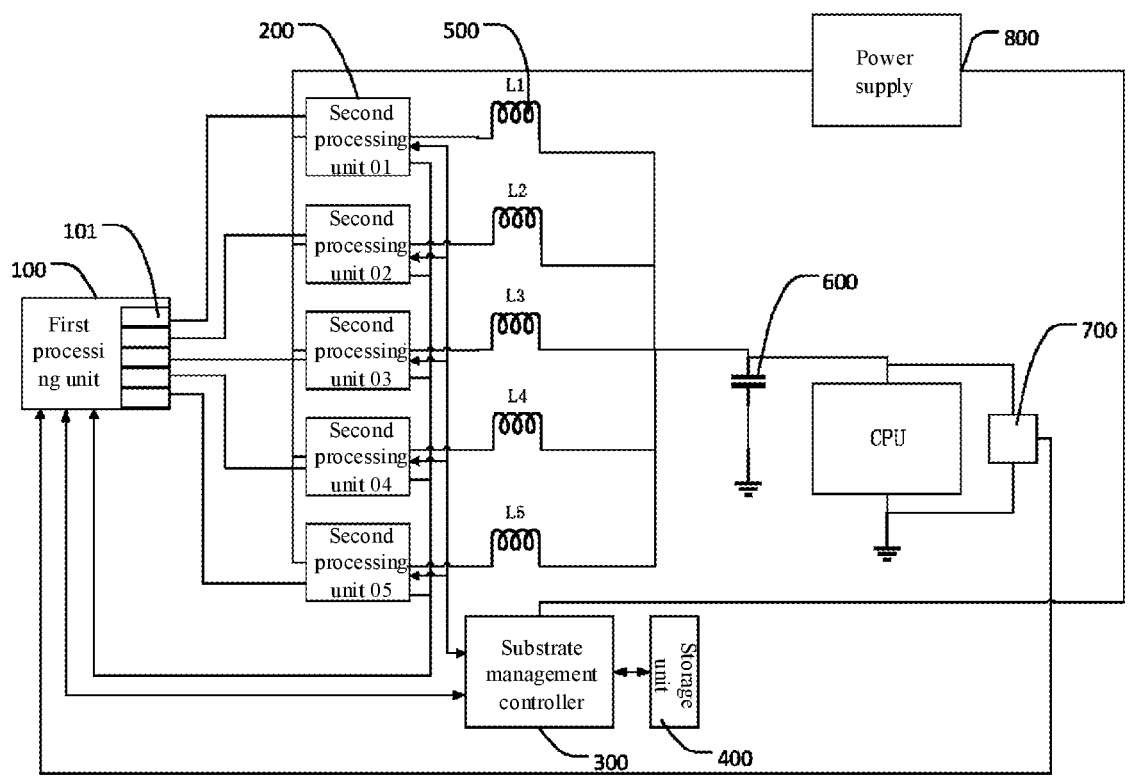
FIG. 1 is a schematic diagram of the architecture of a high reliability multi-phase power supply system according to an embodiment of the present application.

Referring to FIG. 1, the present application provides a high-reliability multiphase power supply system including a first processing unit 100, a second processing unit 200, a substrate management controller 300, a memory unit 400, a filter inductor 500, a filter capacitance 600, a second voltage detection module 700, and a power supply 800.

In an implementation, the first processing unit 100 may be a voltage regulator control chip, the first processing unit 100 is configured with five PWM generation modules 101, the PWM generation modules 101 are electrically connected to a second processing unit 200, and the second processing unit 200 is controlled by outputting pulse signals with different duty cycles; the first processing unit 100 is configured with a power management bus (PMbus) interface, and the PMbus interface of the first processing unit 100 is connected to the substrate management controller 300 via a bus. The first processing unit 100 is communicatively connected to the second processing unit 200.

Figure 2:
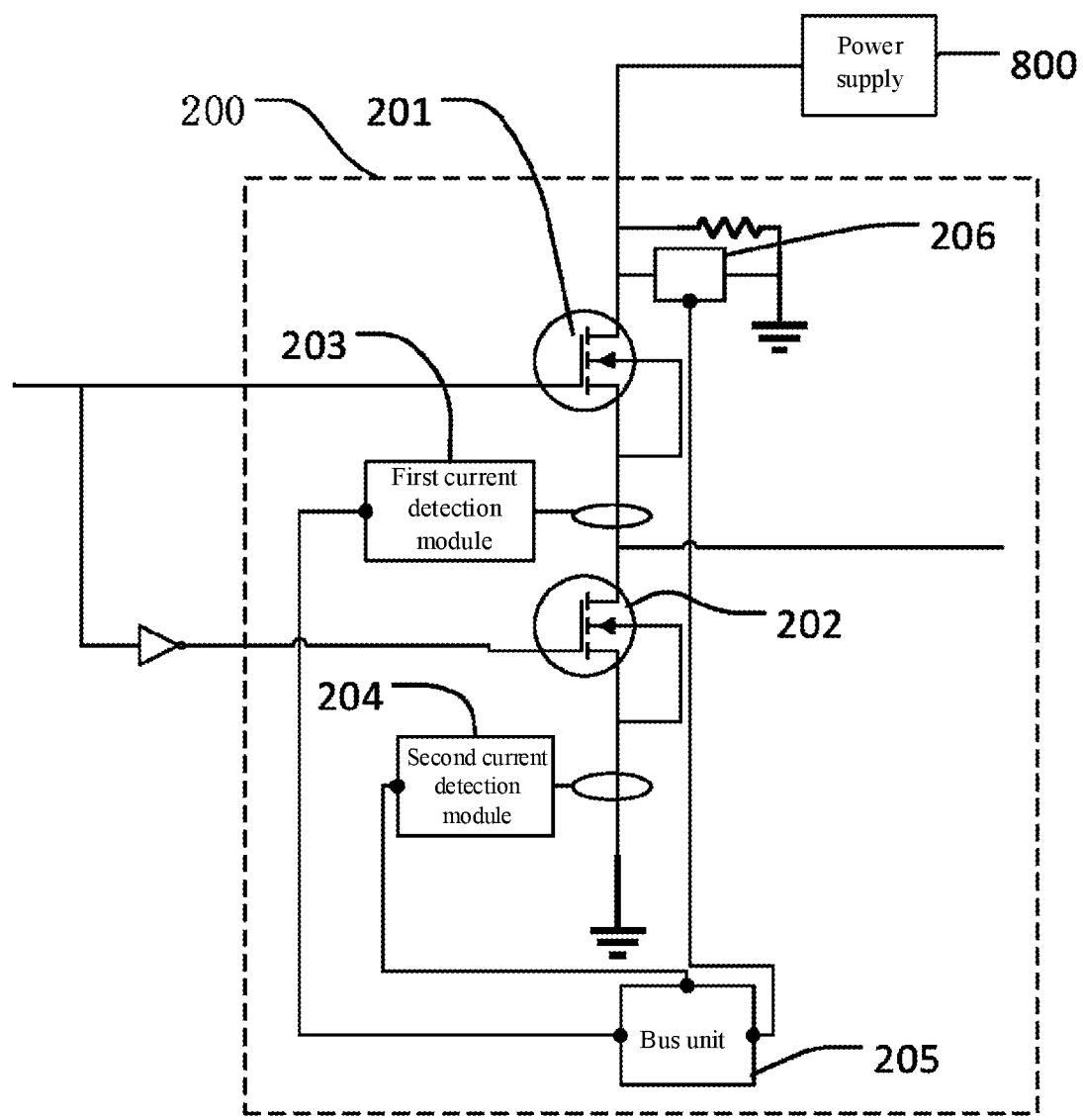
FIG. 2 is a schematic diagram of the architecture of a second processing unit according to an embodiment of the present application.
Figure 3:
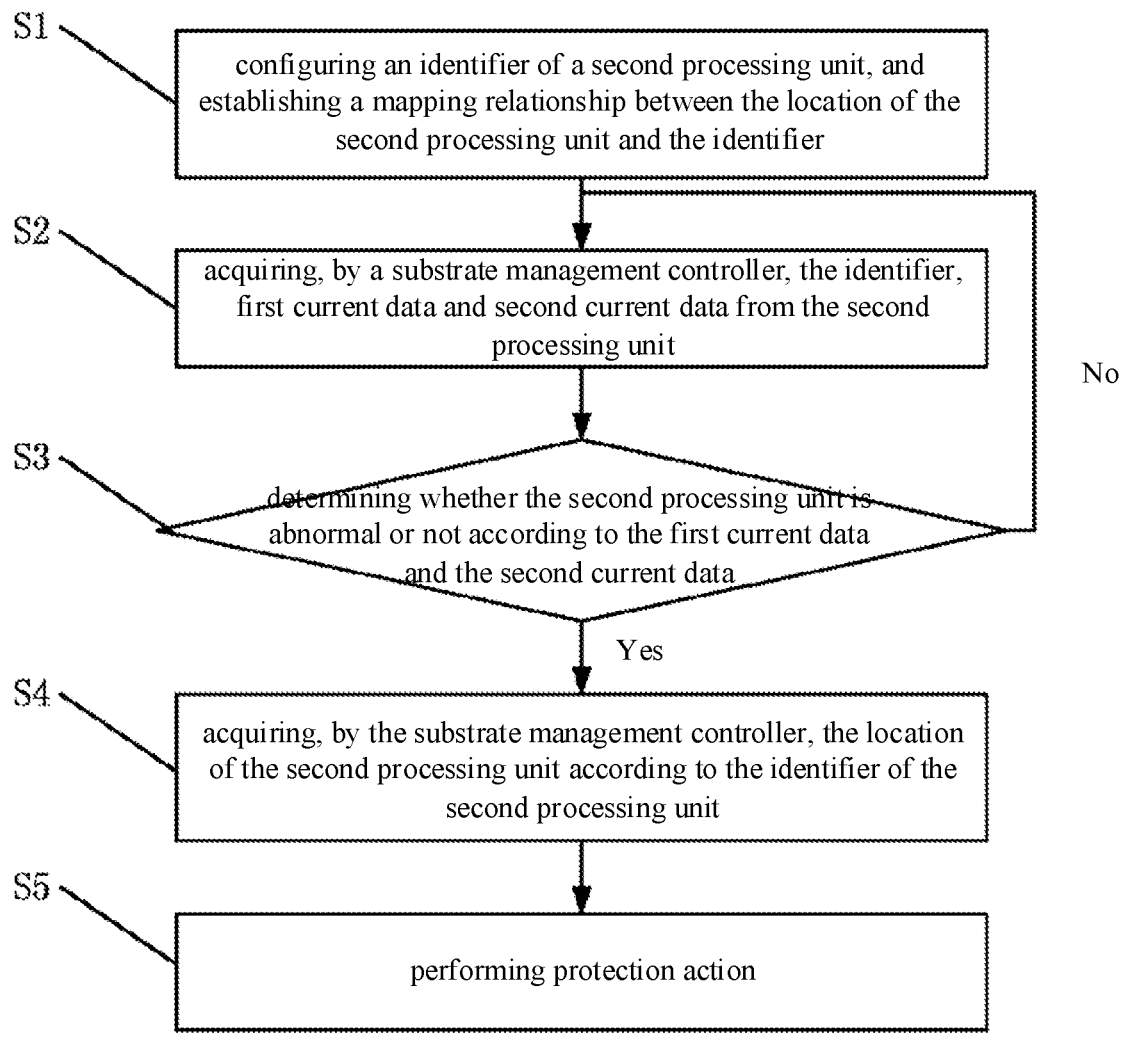
FIG. 3 is a flow chart of a method for fault detecting, locating and processing of a multiphase power supply system according to an embodiment of the present application.

With reference to FIG. 2, the second processing unit 200 is configured with a first field-effect transistor 201, a drain electrode of the first field-effect transistor 201 is connected to a power supply 800, a source electrode of the first field-effect transistor 201 is connected to a drain electrode of a second field-effect transistor 202, a source electrode of the second field-effect transistor 202 is connected to ground, a gate electrode of the first field-effect transistor 201 is electrically connected to an output end of the PWM generation module 101, and a gate electrode of the second field-effect transistor 202 is electrically connected to an output end of the PWM generation module 101 via an inverter. The second processing unit 200 is configured with a first current detection module 203, and the first current detection module 203 detects a source-electrode output current of the first field-effect transistor 201; the second processing unit 200 is configured with a second current detection module 204, and the second current detection module detects a source electrode current of the second field-effect transistor 202; in the implementation process, the first current detection module 203 and the second current detection module 204 use either a Hall current sensor or a mutual inductance current sensor; the second processing unit 200 is configured with a first voltage detection module 206; the first voltage detection module 206 detects a voltage of the power supply 800; and the first voltage detection module 206 is electrically connected to the bus unit 205. The first current detection module 203 and the second current detection module 204 are electrically connected to a bus unit 205; the bus unit 205 is configured with a PMbus interface; the PMbus interface of the bus unit 205 is electrically connected to the substrate management controller 300 via a bus to realize the communication between the second processing unit 200 and the substrate management controller 300; and the bus unit 205 transmits measurement data of the first current detection module 203 and the second current detection module 204 to the substrate management controller 300; in addition, the second current detection module 204 is communicatively connected to the first processing unit 100, and the second current detection module 204 sends a source electrode current value (related to a PWM pulse) of the second field-effect transistor 202 to the first processing unit 100; the first processing unit 100 adjusts the amplitude of the PWM pulse according to the source electrode current values of the second field-effect transistors 202 in different the second processing units 200, to realize the equality of the current outputs of different the second processing units 200.

The substrate management controller 300 is electrically connected to a storage unit 400, the substrate management controller 300 is electrically connected to the power supply 800, the substrate management controller 300 is electrically connected to a CPU, and the substrate management controller 300 is connected to the first processing unit 100 and the second processing unit 200 via a bus.

In the implementation process, the source electrode of any one of the first field-effect transistors 201 is connected to one end of a filter inductor 500, the other ends of all of the filter inductors 500 are electrically connected to a grounded filter capacitor 600 in common, and the other ends of all of the filter inductors 500 are connected to the CPU in common. The alternating current part of the output signal is filtered by the filter inductor 500 and the filter capacitor 600 to ensure that the power supply to the CPU is stable. A second voltage detection module 700 is configured at the CPU and the second voltage detection module 700 detects the divided voltage of the CPU driven by the current provided by the high-reliability multiphase power supply system, and the second voltage detection module 700 is electrically connected to the first processing unit 100 and transmits the same to the first processing unit 100.

Further, the present application provides a multiphase power supply system fault detecting, locating and processing method, wherein the high-reliability multiphase power supply system includes:

S1, configuring an identifier of a second processing unit, and establishing a mapping relationship between the location of the second processing unit and the identifier. The identifier may be address bytes in a data packet performing PMbus communication; any two address bytes used by the second processing unit to communicate with the substrate management controller are different. The address bytes are sorted according to the actual sorting of the second processing unit and stored in a storage unit.

S2, Acquiring, by a substrate management controller, the identifier, first current data and second current data from the second processing unit. A first current detection module of the second processing unit measures and acquires the first current data, and a second current detection module measures and acquires the second current data; the first current detection module and the second current detection module send measurement data to a bus unit; and the bus unit packages the measurement data into a data packet of a PMbus protocol and sends the same to the substrate management controller.

S3, determining whether the second processing unit is abnormal based on the first current data and the second current data. A first threshold value for measuring the first current data and a second threshold value for measuring the second current data are set in the substrate management controller; and the substrate management controller compares the first current data with the first threshold value, compares the second current data with the second threshold value, and the second processing unit is abnormal when the first current data is greater than the first threshold value or the second current data is greater than the second threshold value.

S4, acquiring, by the substrate management controller, the location of the second processing unit according to the identifier of the second processing unit when the second processing unit is abnormal. The substrate management controller acquires the content of the address byte by parsing the data packet sent by the bus unit to acquire the identifier of the abnormal second processing unit; the substrate management controller reads the mapping relationship from the storage unit; and the substrate management controller determines the location of the abnormal second processing unit according to the identifier and the mapping relationship.

S5, performing a protection action when the second processing unit is abnormal.

The protection action includes:
  turning off a power supply input of the abnormal second processing unit;
  turning off the signal output of the PWM generation module connected to the abnormal second processing unit, and reducing a frequency of the CPU to reduce a current demand; and
  recording abnormality information.

When the first current data is greater than the first threshold value, the substrate management controller is triggered to send a first signal to the power supply to turn off the output voltage of the power supply, to avoid the output of the power supply directly entering the CPU and resulting in burning of the CPU due to the first field-effect transistor being broken down.

When the second current data is greater than the second threshold value, the substrate management controller is triggered to send a second signal to the first processing unit to turn off a corresponding PWM generation module in the first processing unit, so that the first field-effect transistor is cut off, and the abnormal second processing unit no longer outputs a current; at the same time, the substrate management controller is triggered to send a third signal to the CPU to control the CPU to work at a reducing frequency, wherein the third signal contains the degree of CPU frequency reduction, and the degree of CPU frequency reduction in the third signal is determined according to the number of abnormal second processing units or the degree of CPU frequency reduction in the third signal is determined according to the CPU fractional pressure measured by the second voltage detection module.

The first processing unit sends an input voltage and an output voltage of a voltage regulator to the substrate management controller via a PMbus interface, and each of the second processing units sends a power supply input voltage VIN, first current data and second current data to the substrate management controller. An abnormality occurs, and the substrate management controller records information when the abnormality occurs in the storage unit. The substrate management controller sends abnormality types and location information about the abnormal second processing unit to the system.

It should be noted that in the claims, any reference signs placed between parentheses shall not be construed as limiting the claim. The word "including" does not exclude the presence of elements or steps not listed in a claim. The word "a" or "an" preceding an element does not exclude the presence of a plurality of such elements. The application may be implemented by means of hardware including a plurality of distinct elements, and by means of a suitably programmed computer. In the unit claims enumerating a plurality of means, a plurality of these means may be embodied by one and the same item of hardware. The use of the words first, second, third, etc. does not denote any order. These words may be interpreted as names.

While an embodiment of the present application has been described, additional variations and modifications to the embodiment will occur to a person skilled in the art once the basic inventive concept is known. Therefore, it is intended that the appended claims be interpreted as including the embodiments and all alterations and modifications that fall within the scope of the present application.

It will be apparent to a person skilled in the art that various modifications and variations may be made in the present application without departing from the spirit or scope of the applications. Thus, it is intended that the present application cover the modifications and variations of this application provided they come within the scope of the appended claims and their equivalents.

The invention claimed is:

1. A high-reliability multiphase power supply system, comprising a second processing unit and a substrate management controller, wherein the second processing unit is configured with a first field-effect transistor, a drain electrode of the first field-effect transistor is connected to a power supply, a source electrode of the first field-effect transistor is connected to a drain electrode of a second field-effect transistor, a source electrode of the second field-effect transistor is connected to ground, and gate electrodes of the first field-effect transistor and the second field-effect transistor are connected to a first processing unit; the second processing unit is configured with a first current detection module, and the first current detection module detects a source-electrode output current of the first field-effect transistor; the second processing unit is configured with a second current detection module, and the second current detection module detects a source electrode current of the second field-effect transistor; the first current detection module and the second current detection module are electrically connected to a bus unit, and the bus unit is electrically connected to the substrate management controller; and the substrate management controller is electrically connected to a storage unit, the substrate management controller is electrically connected to the first processing unit, and the substrate management controller is electrically connected to the power supply;

the second processing unit is configured with a first voltage detection module detecting a voltage of the power supply, and the first voltage detection module is electrically connected to the bus unit;

the bus unit is connected to the substrate management controller via a bus, and transmits measurement data of the first current detection module, the second current detection module and the first voltage detection module to the substrate management controller; the second current detection module is electrically connected to the first processing unit, and transmits measurement data to the first processing unit for realizing output current equalization of different second processing units.

2. The high-reliability multiphase power supply system according to claim 1, wherein the first processing unit is configured with at least two pulse width modulation (PWM) generation modules, and any one of the PWM generation modules is electrically connected to a gate electrode of a first field-effect transistor in the second processing unit, and the PWM generation module is electrically connected to a gate electrode of a second field-effect transistor in the second processing unit via an inverter.

3. The high-reliability multiphase power supply system according to claim 1, wherein the source electrode of any one of the first field-effect transistors is connected to one end of a filter inductor, the other ends of all the filter inductors are electrically connected to a grounded filter capacitor in common, and the other ends of all the filter inductors are connected to a central processing unit (CPU) load in common.

4. The high-reliability multiphase power supply system according to claim 3, wherein a second voltage detection module is configured at the CPU and the second voltage detection module detects the divided voltage of the CPU driven by the current provided by the high-reliability multiphase power supply system, and the second voltage detection module is electrically connected to the first processing unit.

5. A method for fault detecting, locating and processing of a multiphase power supply system, applied to a high-reliability multiphase power supply system, the high-reliability multiphase power supply system comprising a second processing unit and a substrate management controller, wherein the second processing unit is configured with a first field-effect transistor, a drain electrode of the first field-effect transistor is connected to a power supply, a source electrode of the first field-effect transistor is connected to a drain electrode of a second field-effect transistor, a source electrode of the second field-effect transistor is connected to ground, and gate electrodes of the first field-effect transistor and the second field-effect transistor are connected to a first processing unit; the second processing unit is configured with a first current detection module, and the first current detection module detects a source-electrode output current of the first field-effect transistor; the second processing unit is configured with a second current detection module, and the second current detection module detects a source electrode current of the second field-effect transistor; the first current detection module and the second current detection module are electrically connected to a bus unit, and the bus unit is electrically connected to the substrate management controller; and the substrate management controller is electrically connected to a storage unit, the substrate management controller is electrically connected to the first processing unit, and the substrate management controller is electrically connected to the power supply;

wherein the method for fault detecting, locating and processing of the multiphase power supply system comprises:

configuring an identifier of the second processing unit, and establishing a mapping relationship between a location of the second processing unit and the identifier;

acquiring the identifier, first current data and second current data from the second processing unit, and determining whether the second processing unit is abnormal and an abnormal type according to the first current data and the second current data;

acquiring the location of the second processing unit according to the identifier of the second processing unit when the second processing unit is abnormal; and performing a protection action when the second processing unit is abnormal.

6. The method for fault detecting, locating and processing of the multiphase power supply system according to claim 5, wherein the first current detection module of the second processing unit measures and acquires the first current data, the second current detection module measures and acquires the second current data, and the substrate management controller acquires the first current data and the second current data via the bus unit;

a first threshold value that measures the first current data and a second threshold value that measures the second current data are set in the substrate management controller;

the substrate management controller compares the first current data with the first threshold value, compares the second current data with the second threshold value, and the second processing unit is abnormal when the first current data is greater than the first threshold value or the second current data is greater than the second threshold value.

7. The method for fault detecting, locating and processing of the multiphase power supply system according to claim 6, wherein the mapping relationship is stored in the storage unit, the substrate management controller acquires the identifier of the abnormal second processing unit and the mapping relationship, and the substrate management controller determines the location of the abnormal second processing unit according to the identifier and the mapping relationship.

8. The method for fault detecting, locating and processing of the multiphase power supply system according to claim 7, wherein the protection action further comprises:

turning off a power supply input of the abnormal second processing unit, when the first current data is greater than the first threshold; when the second current data is greater than the second threshold value, turning off the signal output of the PWM generation module connected to the abnormal second processing unit, and reducing a frequency of a CPU to reduce a current demand; and recording abnormality information.

9. The method for fault detecting, locating and processing of the multiphase power supply system according to claim 5, wherein the identifier comprises address bytes in a data packet performing PMbus communication.

10. The method for fault detecting, locating and processing of the multiphase power supply system according to claim 9, wherein any two address bytes used by the second processing unit to communicate with the substrate management controller are different.

11. The method for fault detecting, locating and processing of the multiphase power supply system according to claim 9, wherein the address bytes are sorted according to an actual sorting of the second processing unit and stored in the storage unit.

12. The method for fault detecting, locating and processing of the multiphase power supply system according to claim 9, wherein the second processing unit is configured with a first voltage detection module detecting a voltage of the power supply, and the first voltage detection module is electrically connected to the bus unit.

13. The method for fault detecting, locating and processing of the multiphase power supply system according to claim 12, wherein the bus unit is connected to the substrate management controller via a bus, and transmits measurement data of the first current detection module, the second current detection module and the first voltage detection module to the substrate management controller; the second current detection module is electrically connected to the first processing unit, and transmits measurement data to the first processing unit for realizing output current equalization of different second processing units.

14. The method for fault detecting, locating and processing of the multiphase power supply system according to claim 13, wherein the bus unit packages the measurement data into a data packet of a PMbus protocol and sends the measurement data to the substrate management controller.

15. The method for fault detecting, locating and processing of the multiphase power supply system according to claim 14, wherein the substrate management controller acquires contents of the address bytes by parsing the data packet sent by the bus unit to acquire the identifier of the abnormal second processing unit.

16. The method for fault detecting, locating and processing of the multiphase power supply system according to claim 8, wherein when the first current data is greater than the first threshold value, the substrate management controller is triggered to send a first signal to the power supply to turn off an output voltage of the power supply.

17. The method for fault detecting, locating and processing of the multiphase power supply system according to claim 8, wherein when the second current data is greater than the second threshold value, the substrate management controller is triggered to send a second signal to the first processing unit to turn off the corresponding PWM generation module in the first processing unit.

18. The method for fault detecting, locating and processing of the multiphase power supply system according to claim 17, wherein when the substrate management controller is triggered to send a second signal to the first processing unit, the substrate management controller is triggered to send a third signal to the CPU to control the CPU to work at a reducing frequency at a same time.

* * * * *